United States Patent [19]

Ikedo et al.

[11] Patent Number: 4,839,764
[45] Date of Patent: Jun. 13, 1989

[54] DISK MECHANISM IN A DISK PLAYER

[75] Inventors: Yuji Ikedo; Takahiro Okajima; Yasuyuki Tashiro, all of Saitama, Japan

[73] Assignee: Pioneer Electronic Corporation, Tokyo, Japan

[21] Appl. No.: 32,694

[22] Filed: Apr. 1, 1987

[30] Foreign Application Priority Data

Apr. 1, 1986 [JP] Japan .................................. 61-75011
Apr. 1, 1986 [JP] Japan .................................. 61-75012
Apr. 1, 1986 [JP] Japan .................................. 61-75014
Apr. 1, 1986 [JP] Japan .................................. 61-75015

[51] Int. Cl.$^4$ ...................... G11B 17/00; G11B 5/012
[52] U.S. Cl. ............................ 360/98.08; 360/99.05; 360/99.12
[58] Field of Search ................................ 360/97-99, 360/78, 131-133

[56] References Cited

U.S. PATENT DOCUMENTS

| 4,170,031 | 10/1979 | Bruch et al. | 360/98 |
| 4,453,188 | 6/1984 | Johnson et al. | 360/78 |
| 4,717,976 | 1/1988 | Nishimura et al. | 360/97 |

Primary Examiner—John H. Wolff
Attorney, Agent, or Firm—Sughrue, Mion, Zinn, Macpeak and Seas

[57] ABSTRACT

A disk player comprising a turntable and a clamp mechanism for clamping a disk put on the turntable, the clamp mechanism pushing the disk in cooperation with the turntable and moving its parts toward and away from the turntable, the moving mechanism comprising a pair of support members, the pair of support member being swingable in planes nearly perpendicular to the disk bearing side of the turntable and free ends of the pair of support members being capable of contacting with the disk pushing side and the opposite side of the pushing mechanism, respectively, to pinch the pushing mechanism therebetween, and a driver for driving the pair of support members.

6 Claims, 20 Drawing Sheets

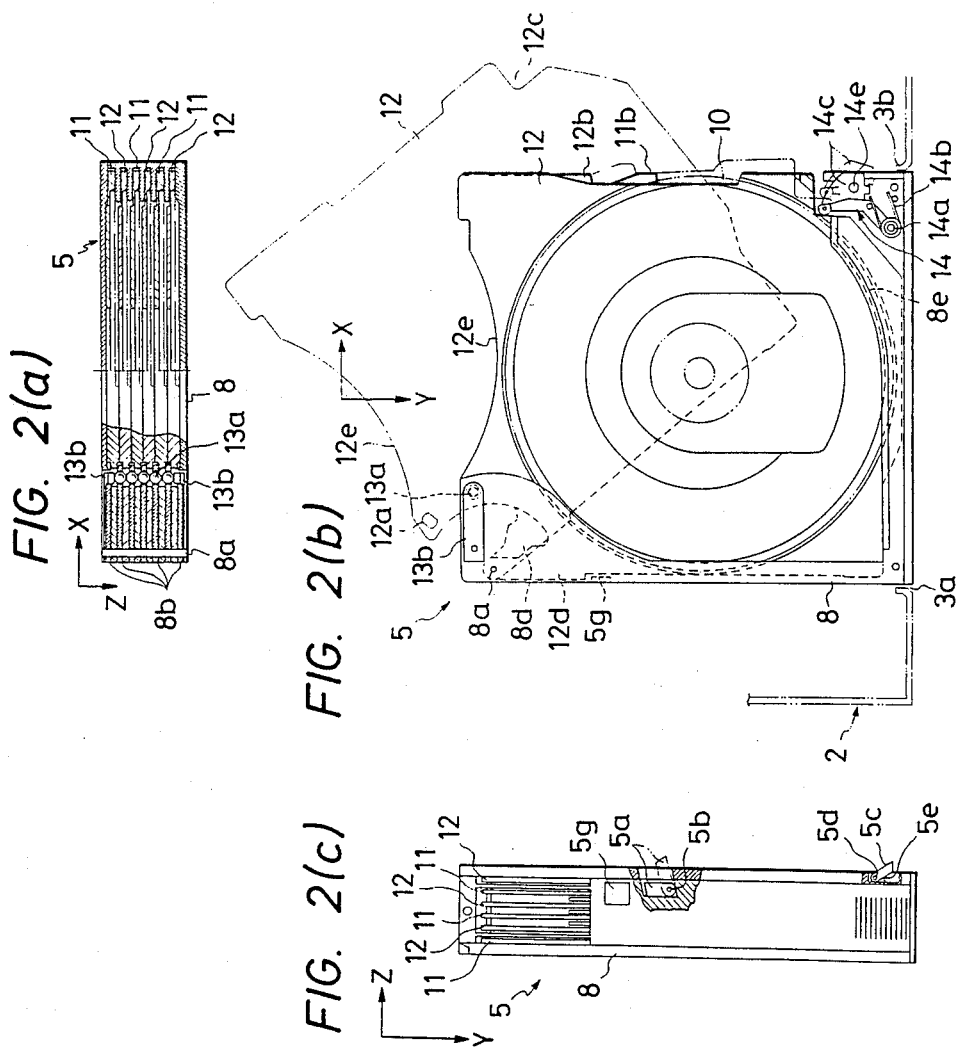

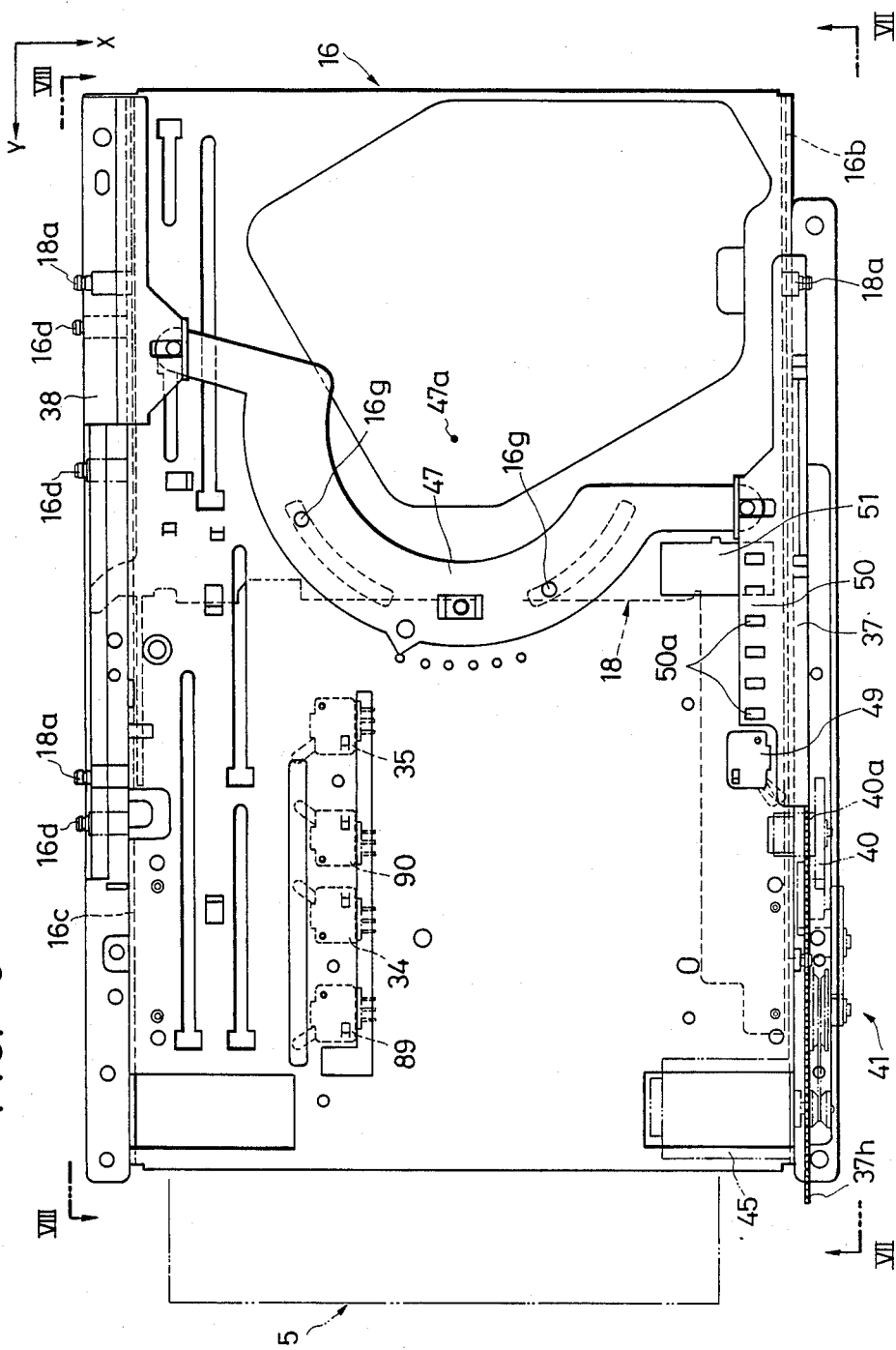

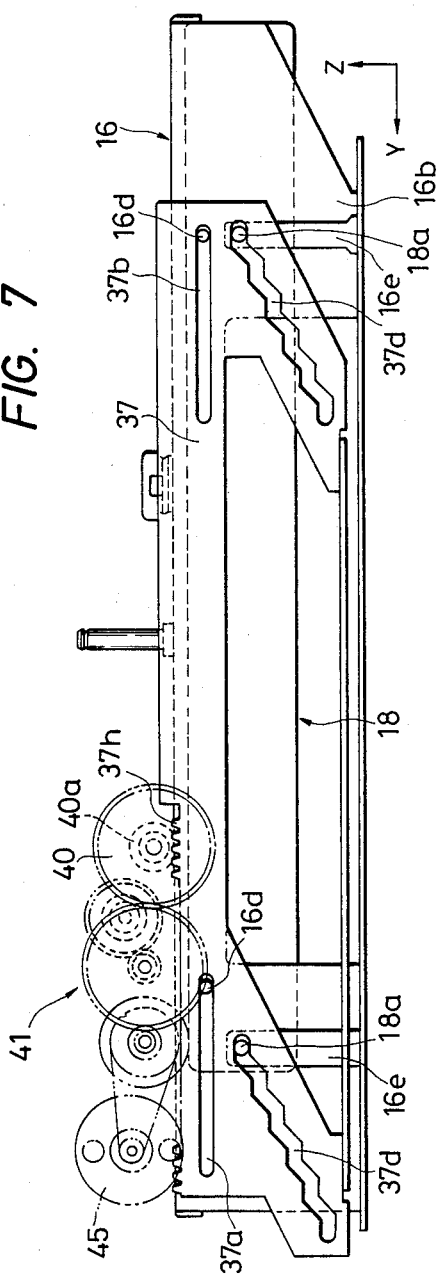
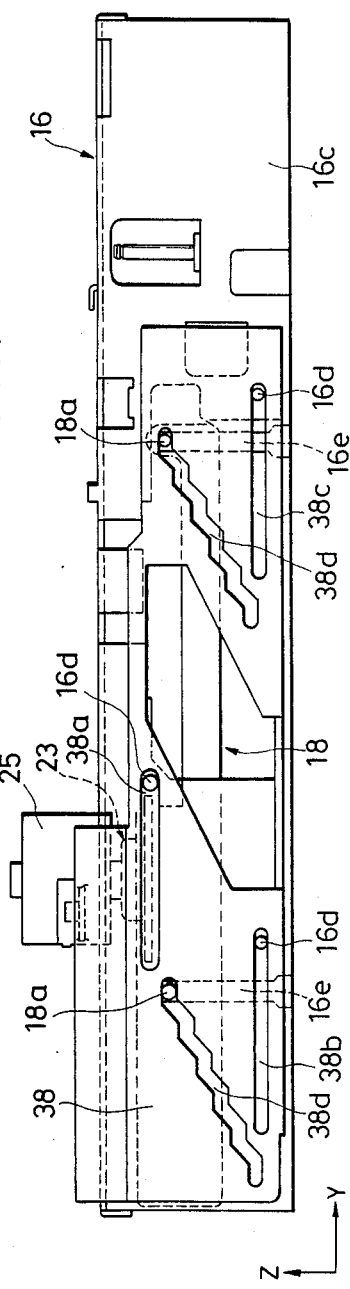

FIG. 13(b)   FIG. 13(a)
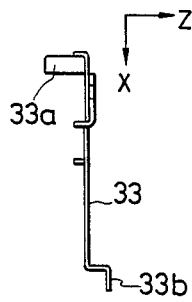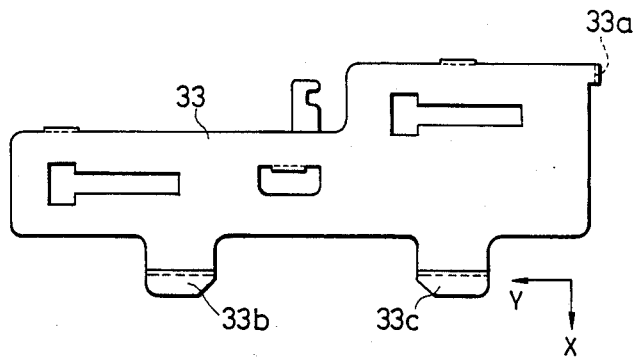
FIG. 14
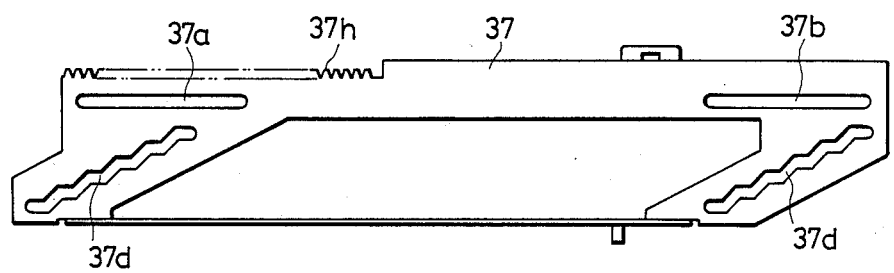
FIG. 15
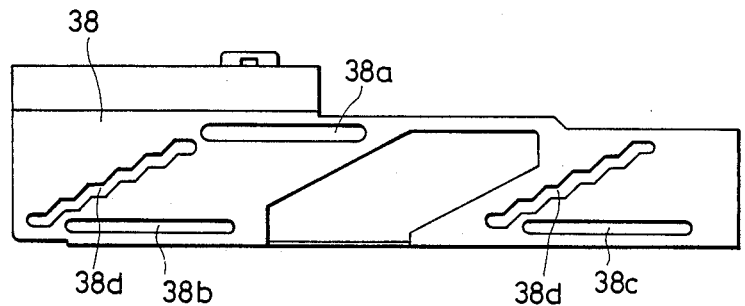

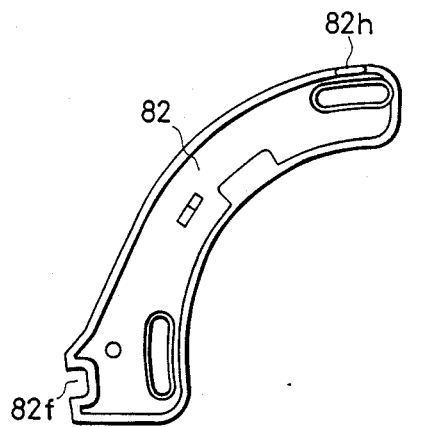
FIG. 26(a)
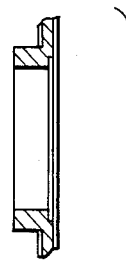
FIG. 27
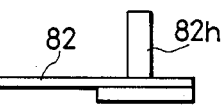
FIG. 26(b)
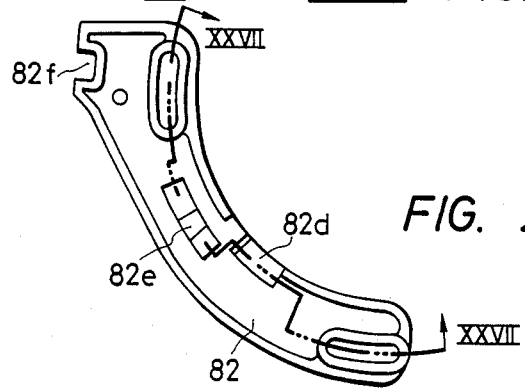
FIG. 26(c)
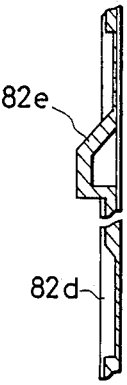
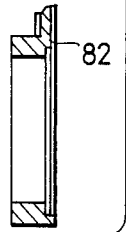

DISK MECHANISM IN A DISK PLAYER

BACKGROUND OF THE INVENTION

The present invention relates to a disk player, particularly to a disk player of the automatic loading type. The present invention also relates to a multidisk player.

A disk put on the turntable of a conventional disk player of the automatic loading type, in which a disk conveyance mechanism for automatically conveying the disk to a played position on the turntable is provided to eliminate the manual operation of loading the disk on the turntable, is automatically clamped thereon by a clamp mechanism shown in FIG. 31. The clamp mechanism comprises a disk-shaped pusher 152, which acts to clamp the disk in cooperation with the turntable 151 which rotates while bearing the disk 150 to be played, and a support 154, which is borne in a swingable manner within a prescribed range by a support shaft 153 extending in parallel with the main surface of the turntable 151 and bears the pusher 152 rotatably by the free end of the support. A helical spring (not shown in the drawing), which urges the support 154 in such a direction as to move the free end thereof toward the turntable 151, or the like is used to apply a pushing force to the disk 150. In this clamp mechanism, since the stroke H of the swing of the support 154, which is necessary to prevent the pusher 152 and the disk 150 from coming into contact with each other when the disk is released from the clamp mechanism, is large, it causes a problem that it is very difficult to reduce the size of the disk player.

A multidisk player is able to contain a plurality of disks, successively select any one of the contained disks and continuously replay them. The conventional multidisk player has an extremely large body, and the total cost of the multidisk player is high.

SUMMARY OF THE INVENTION

The present invention intends to solve the above-mentioned problems and other problems.

Accordingly, it is an object of the present invention to provide a disk player whose size, particularly height, and also cost are easy to be reduced.

It is another object of the present invention to provide a multidisk player whose size and cost are easy to be reduced.

To achieve the foregoing objects and advantages, a disk player of the present invention comprises a turntable and a clamp mechanism for clamping a disk put on the turntable, the clamp mechanism having pushing means for clamping the disk in cooperation with the turntable and moving means for moving the pushing means toward and away from the turntable, the moving means comprising a pair of support members, the pair of support members being swingable in planes nearly perpendicular to the disk bearing side of the turntable and free ends of the pair of support members being capable of contacting with the disk pushing side of the pushing means and the opposite side of the pushing means, respectively, to pinch the pushing means therebetween, and drive means for driving the pair of supporting members.

Furthermore, according to the present invention, the pushing means is tightened to the turntable before the pair of support members are separated from the pushing means, to thereby complete the clamping of the disk, and the pair of support members pinch the pushing means therebetween before the pushing means is separated from the turntable to thereby release the clamping of the disc.

A disk player of the present invention comprises a turntable for bearing a disk, the turntable having a magnet, a spindle motor for bearing and rotating the turntable, a clamping mechanism for clamping the disk mounted on the turntable, the clamping mechanism having pushing means for clamping the disk in cooperation with the turntable by magnet force of the magnet and moving means for moving the pushing means toward and away from the turntable and holding means for holding the spindle motor, the holding means being made of magnetic material and being placed to face the reverse side of a disk bearing side of the turntable.

Furthermore, a multidisk player of the present invention comprises a player housing, playing means for playing the disk, the playing means having a turntable for mounting a disk thereon and being placed inside of the player housing, disk holding means for holding a plurality of disks, the disk holding means capable of being inserted into the player housing to be loaded at a loading portion inside of the player housing, the disk holding means comprising a housing portion and a plurality of tray members for bearing disks, the tray members being provided inside of the housing portion in such a manner that the tray members are disposed in a direction nearly perpendicular to the disk bearing side of the turntable, the tray members being capable of protruding out of the housing portion and disk takeout and conveyance mechanism for taking a disk out of the disk holding means and conveying the disk to a playing position, the disk take out and conveyance mechanism having a supporting member extending in a direction of the disposition of the tray members, moving member provided on the supporting member movably in the direction of the disposition of the tray members, protruding means for protruding the tray member out of the housing portion of the tray holding means by engaging its one rotational end with the tray member in the tray holding means, the protruding means being rotatably provided on the moving member, moving means for moving the protruding means together with the moving member to a position where the one rotational end of the protruding means is engageable with the tray member, pushing means for clamping the disc in cooperation with the turntable, supporting means for rotatably supporting the pushing means, the supporting means being movable in planes nearly perpendicular to the disk bearing side of the turntable, first lever means for moving the supporting means, the first lever means being provided on the supporting member movably in the disk holding means loading direction, second lever means for rotating the tray protruding means, the second lever means being provided on the supporting member movably in the first lever moving direction, moving means for moving the first and second lever means, the first and second lever means moving means being provided on the supporting member movably in the first and second lever means moving direction, driving force application means for applying driving force to the first and second lever moving means, and locking/unlocking means for selectively locking/unlocking the first and second lever means with respect to the moving means depending on the movement of the moving means.

Additional objects and advantages will be obvious from the description, or may be learned by practice of the invention.

BRIEF DESCRIPTION OF THE DRAWING

The accompanying drawings, which constitute a part of the specification, illustrate one embodiment of the invention, and, together with the description, serve to disclose the principles of the invention. Of the drawings:

FIGS. 2(a), 2(b), 3(a), 3(b), 4(a), 4(b), 5(a) and 5(b) show views for illustrating a magazine of the present invention;

FIG. 6 shows a plan view of the internal constitution of the disk player of the present invention;

FIGS. 7 and 8 show a view taken along lines VII—VII and VIII—VIII shown in FIG. 6;

FIGS. 13(a) and 13(b) show views for illustrating the moving lever in the disc player of the present invention;

FIGS. 14 and 15 show views for illustrating the moving plates in the disk player of the present invention;

FIGS. 26(a), 26(b), 26(c) and 27 show views for illustrating the clamp cam of the disk player of the present invention;

DESCRIPTION OF THE PREFERRED EMBODIMENTS

A disk player of a preferred embodiment of the present invention is hereinafter described with reference to the accompanying drawings. The disk player is a multiple disk player (or a multidisk player) in which a plurality of disks can be housed and desired ones of the housed disks can be sequentially selected and played.

Figure 1:
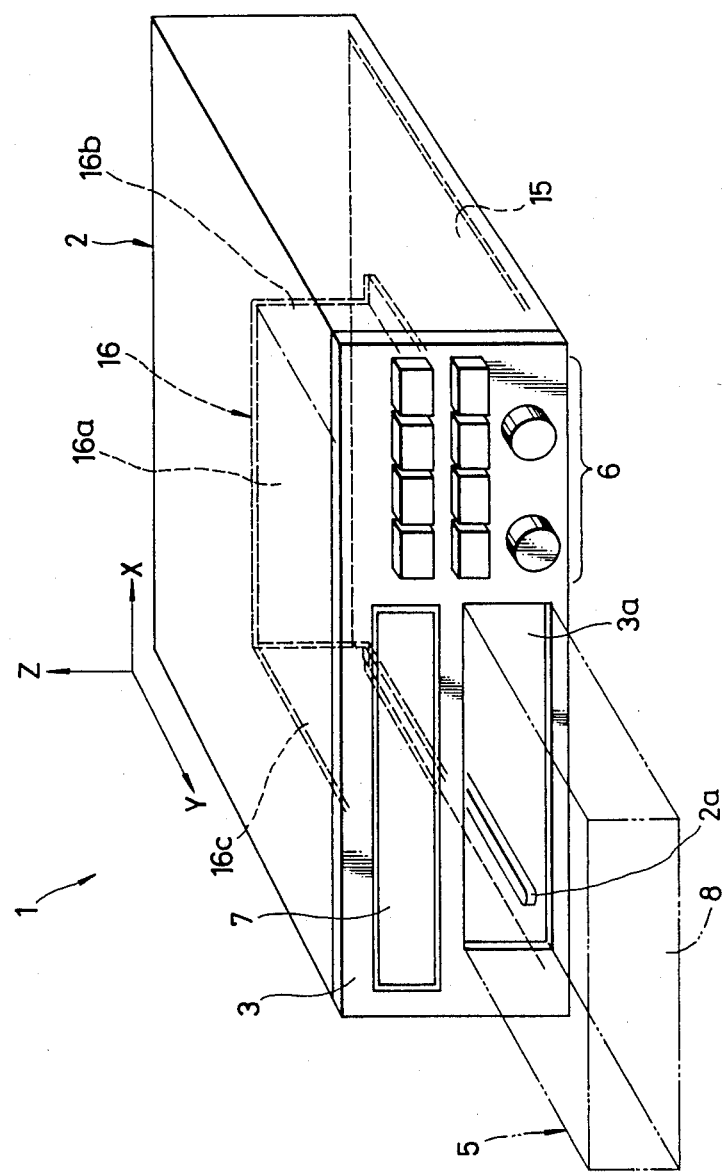
FIG. 1 shows a perspective view of a whole disk player provided in accordance with the present invention.

A reference numeral 1 in FIG. 1 denotes the disk player as a whole. The front panel 3 of a player housing 2 has an oblong opening 3a for loading a magazine 5 as a disk holder into the housing. The opening 3a extends in the rightward and leftward direction. (An arrow Y indicates the forward direction. An arrow X indicates the leftward direction. An arrow Z indicates the upward direction.) A display section 7 and operation buttons 6 for operating the disk player are provided on the front panel 3.

As shown in FIGS. 2(a), 2(b) and 2(c), the magazine 5 comprises a magazine body 8, which is flat and rectangular as a whole and serves as a housing, and three trays 11 as a first kind and another three trays 12 of another kind, the total number of which is six. Each of the trays 11 and 12 is shaped as a square plate. Disks 10 are borne on the main sides of the trays 11 and 12. The trays 11 and 12 (hence the disks 10 as well) are sequentially disposed at prescribed intervals in an upward and a downward directions (the direction of the arrow Z and the opposite direction) perpendicular to the disk bearing side of a turntable described hereinafter. The trays 11 and 12 can be rotated about a rotary support shaft 8a provided at the right rear corner of the magazine body 8 and extending upward and downward (in the direction of disposition of the trays), so that each of the trays can be moved into and out of the magazine body along the plane of the main side of the tray.

The constitution of the magazine 5 is described in detail from now on. The magazine body 8 is provided with seven partitions 8b disposed upward and downward (in the direction of the arrow Z and the opposite thereof). The trays 11 and 12 are located between the partitions 8b.

Figure 3A:
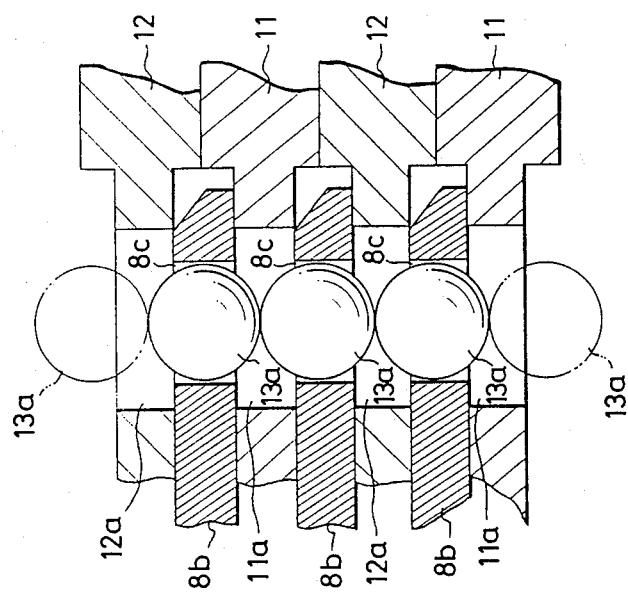

As shown in FIG. 3(a), the partitions 8b have small circular openings 8c coaxial with each other and located near the rotary support shaft 8a.

FIGS. 4(a), 4(b), 5(a) and 5(b) show the details of the trays 11 and 12. The trays are provided with openings 11a and 12a so that the openings 11a and 12a can face the openings 8c of the partitions 8b. The openings 8c of the partitions 8b are referred to as the first openings. The openings 11a and 12a of the trays 11 and 12 are referred to as the second openings. Five spherical movable members 13a, which can be moved along the direction (the direction of the arrow Z and the opposite thereof) of disposition of the partitions 8b, are fitted in the openings 8c, 11a and 12a. The diameter of each of the spherical movable members 13a is equal to the interval of disposition of the trays 11 and 12. A pair of plate springs 13b (FIGS. 2(a) and 2(b)) provided at the top and bottom of the magazine body 8 urge the spherical movable members 13a in such directions as to move the spherical members 13a toward each other.

As shown in FIG. 2(b), a push lever 14 is provided at the left front corner of the magazine body 8 and extends nearly forward and backward (in the direction of the arrow Y and the opposite thereof). The push lever 14 is attached at the front end thereof to the magazine body 8 by a pin 14a so that the push lever is swingable. The pin 14a extends upward and downward (in the direction of the arrow Z and the opposite thereof). The rear end of the push lever 14 can be smoothly engaged with the free end of each of the trays 11 and 12. A spring member 14b is engaged with the push lever 14 and urges it counterclockwise (as to FIG. 2(b)) to apply a tray pushing force to the lever. The push lever 14 is provided with a projection 14c. The projection 14c can be brought into contact with the edge portion 3b along the opening 3a of the player housing 2 thereof when the magazine 5 is pulled out of the magazine loading portion in the player housing. When the projection 14c contacts with the edge portion 3b along the opening 3a, the projection 14c acts to swing the push lever 14 to urge the trays 11 and 12 toward their housed positions in the magazine body 8.

The push lever 14 and the spring member 14b constitute a push means for pushing the trays 11 and 12 toward the housed positions and the rotary support shaft 8a in the magazine body 8.

The push means, the openings 8c (first openings) of the partitions of the magazine body 8, the openings 11a and 12a (second openings) of the trays 11 and 12, the spherical movable members 13a and the plate springs 13b constitute a holding mechanism for holding the trays in the housed positions in the magazine body.

As shown in FIGS. 4(a), 4(b), 5(a) and 5(b), the trays 11 and 12 have almost the same shape but only differ from each other in the shapes and positions of claws 11b and 12b, which the listener grabs with his fingertip when he pulls out the tray from the magazine body 8. The free end portions of the trays 11 and 12 have notches 11c and 12c, in which the push lever 14 is engaged. The free end portions also have pairs of jig insertion holes 11d, 11e, 12d and 12e.

Soft members 11f and 12f made of synthetic leather or the like are provided in prescribed positions on the main sides of the trays 11 and 12, which can face the disk bearing sides of the adjacent trays. The trays 11 and 12 are provided with arc-shaped recesses 11h, 11i, 12h and 12i along the loci of movement of the soft members 11f and 12f provided on the adjacent trays. Since the recesses 11h, 11i, 12h and 12i are provided, the height of the pileup of the six trays 11 and 12 in all is reduced, namely, the height of the magazine 5 is reduced.

As shown in FIG. 2(c), an engaging claw 5a, is provided almost at the central portion of the right side of the magazine 5 and attached at its one end thereof to the magazine body 8 by a pin 5b so that the claw 5a can be swung in a prescribed range. Another engaging claw 5c is attached at one end thereof to the right front corner of the magazine 5 by a pin 5d so that the claw can be swung in a prescribed range. The free end second engaging claw 5c is urged outward by a helical spring 5e. The free ends of the engaging claws 5a and 5c can be engaged with the edge portion 3b along the opening 3a (refer to FIGS. 1 and 2(b)).

The engaging claws 5a and 5c and the helical spring 5e constitute a loading prevention means for preventing the magazine 5 from being loaded into the loading portion of the player housing 2 when the posture of the magazine is not proper for the loading thereof. When the magazine 5 is being loaded upside down into the loading portion, the engaging claw 5a swings due to the weight thereof and projects outward from the magazine 5 and the free end of the claw is engaged with the edge portion 3b along the opening 3a to prevent the magazine from being loaded. When the magazine 5 is being loaded with its front side back into the loading portion, the engaging claw 5c protruded outward by the helical spring 5e is engaged with the edge portion 3b of the opening 3a to prevent the magazine 5 from being loaded.

Since the loading prevention means is constituted by the engaging claws 5a and 5c and the helical spring 5e which are simple members, the constitution is simple enough to make it easy to reduce the cost of the disk player.

Figure 3B:
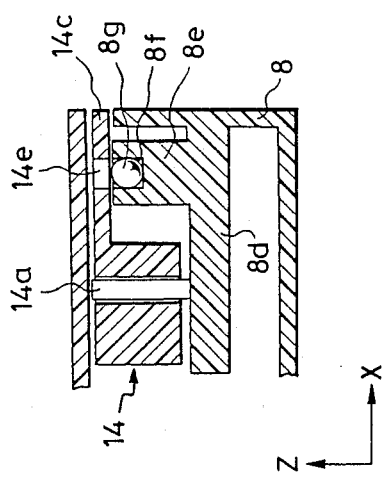
Figure 4A:
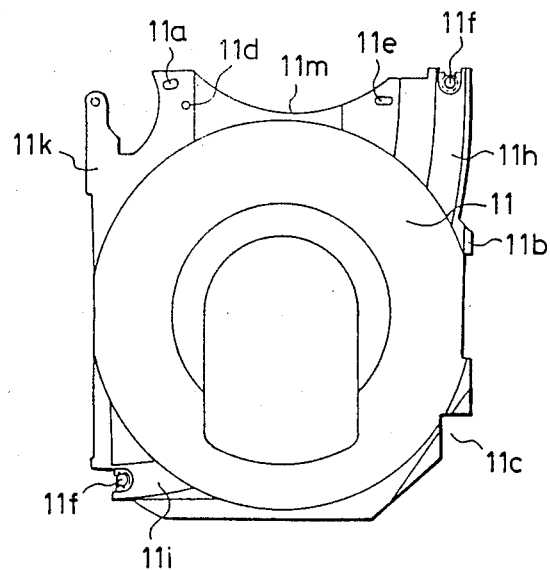
Figure 4B:
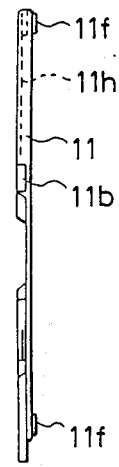
Figure 5A:
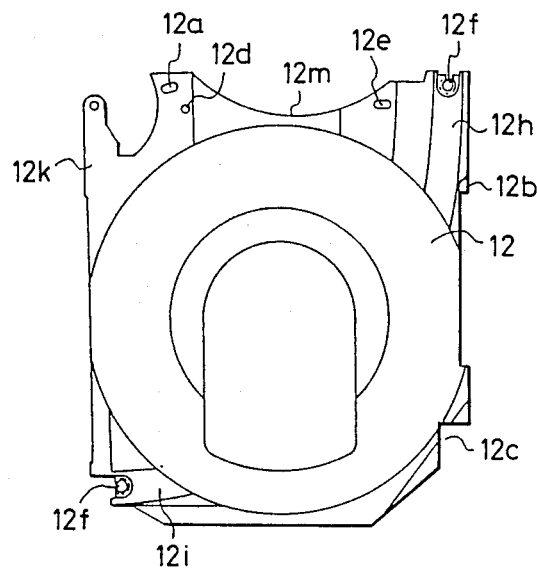
Figure 5B:
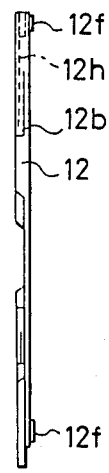

As shown in FIGS. 2(b) and 3(b), a circular opening 14e is provided in the projection 14c of the push lever 14 supported in a swingable manner on the magazine 5. As shown in FIG. 3(b), the housing body 8 of the magazine 5 is provided with an overhang portion 8d extending along the bottom of the push lever 14. A pillar-like projection 8e is provided on the overhang 8d. A circular recess 8ff is provided in the top of the projection 8e. A spherical movable member 8g is provided in the recess 8f so that the member 8g can be moved upward and downward (in the direction of the arrow Z and the opposite thereof). When the push lever 14 is in a position shown by a full line in FIG. 2(b), the opening 14e of the projection 14c of the push lever can face the recess 8f and a part of the spherical movable member 8g can be fitted in the opening 14e.

The push lever 14 and the spherical movable member 8g constitute a protrusion restricting means for restricting the protrusion of the trays 11 and 12 from the magazine body 8 when the magazine 5, which serves as a disk holder, is in the posture of being upside down. To be more specific, when the magazine 5 is in that posture, the spherical movable member 8g moves due to its the weight thereof and a part of the spherical member 8g member enters into the opening 14e of the push lever 14 to restrict the swing of the push lever 14 to restrain the protrusion of the trays 11 and 12 out of the magazine body 8.

Since the protrusion restricting means is constituted by the push lever 14 and the spherical movable member 8g which are members of simple forms, the constitution is simple enough to make it easy to reduce the cost of the disk player. The spherical movable member 8g may not be manufactured for the disk player in particular but may be one readily available on the market.

As shown in FIG. 1, a chassis 16 is mounted as a support member on a bottom plate 15 secured in the housing 2. The chassis 16 comprises a horizontal surface portion 16a extending forward and backward (in the direction of the arrow Y and the opposite thereof) and right and leftward (in the direction of the arrow X and the opposite thereof), and a pair of vertical surface portions 16b and 16c continuous to the right and left ends of the horizontal surface portion 16a and extending forward and backward (in the direction of the arrow Y and the opposite thereof) and upward and downward (in the direction of the arrow Z and the opposite thereof or in the direction of disposition of the trays).

Figure 9:
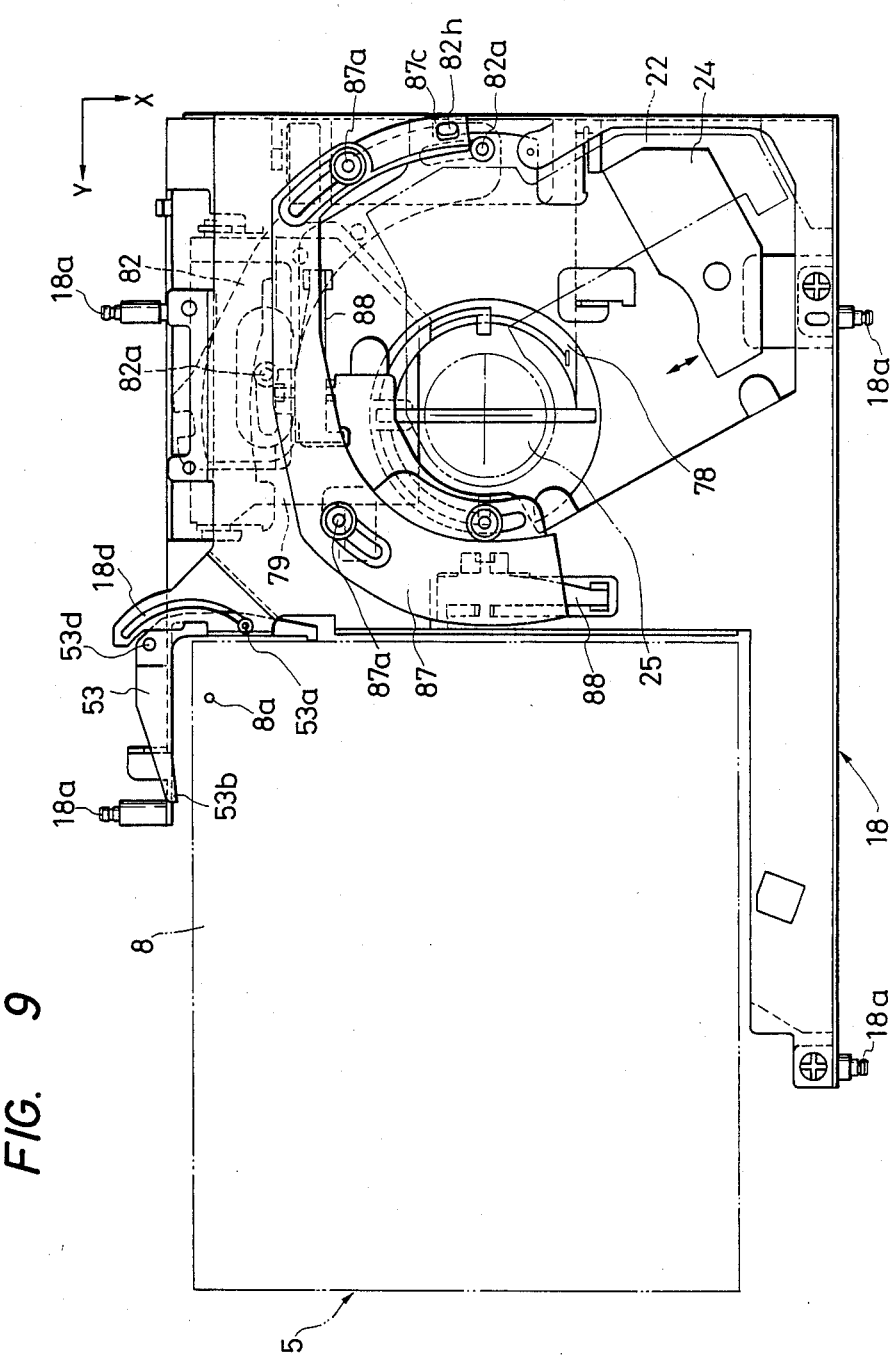
FIG. 9 shows a partial plan view of the internal constitution of the disk player of the present invention.

As shown in FIGS. 6 and 9, a moving member 18 is provided between the rear ends of the vertical surface portions 16b and 16c of the chassis 16 and attached to the face portions 16b and 16c so that the moving member 18 can be moved upward and downward (in the direction of disposition of the trays 11 and 12).

As shown in FIG. 9, a bearing plate 22 is attached as a holding member to the top of the moving member 18.

Figure 10:
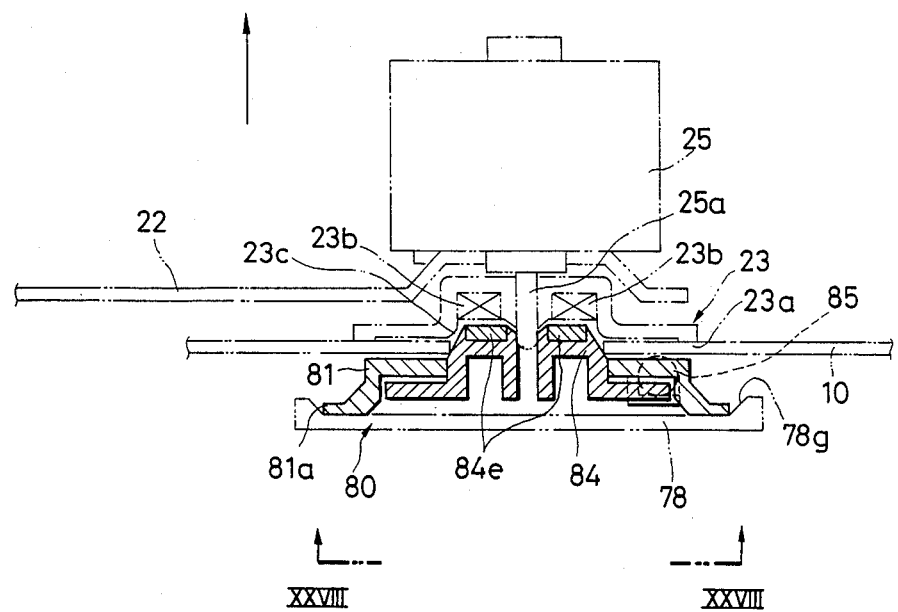
FIG. 10 shows a sectional view of the disk clamp mechanism of the present invention.

As shown in FIGS. 8 and 10, the turntable 23 is mounted on the bearing plate 22.

As shown in FIG. 9, a carriage 24 bearing an optical pickup means is provided on the bearing plate 22 and is attached is to the bearing plate 22 so that the carriage can be moved along a plane, (which contains the disk bearing side 23a (shown in FIG. 10) of the turntable in nearly rightward and leftward directions (in the direction of the arrow X and the opposite thereof).

The turntable 23 is directly rotated by a spindle motor 25 shown in FIGS. 8 and 10.

A carriage drive means for driving the carriage 24 is provided on the bearing plate 22.

The turntable 23, the spindle motor 25, the carriage 24 including the optical pickup means and the carriage drive means constitute a playing means for playing the disk. The playing means is borne on the moving member 18 so that the playing means is moved together with the moving member upward and downward (in the direction of the arrow Z and the opposite thereof).

As shown in FIG. 10, the turntable 23 is provided with a magnet 23b. The pusher 80 of the clamping mechanism has a member 84e made of magnetic material at its yoke portion. Therefore, a clamping force with to the disk-shaped pusher of the clamp mechanism is produced by the magnet force of the magnet 23b. Furthermore, according to the present invention, the bearing plate 22 for holding the spindle motor 25 and the turntable 23 is made of a magnetic material and emplaced to face the side of the turntable 23 opposite to the disk bearing side thereof so that the turntable is attracted toward the bearing plate 22 by the magnetic force of the magnet 23b. For that reason, the output shaft 25a of the spindle motor 25 and a bearing portion (not shown in the drawings) of the spindle motor for supporting the output shaft are put into tight contact with each other.

Figure 12:
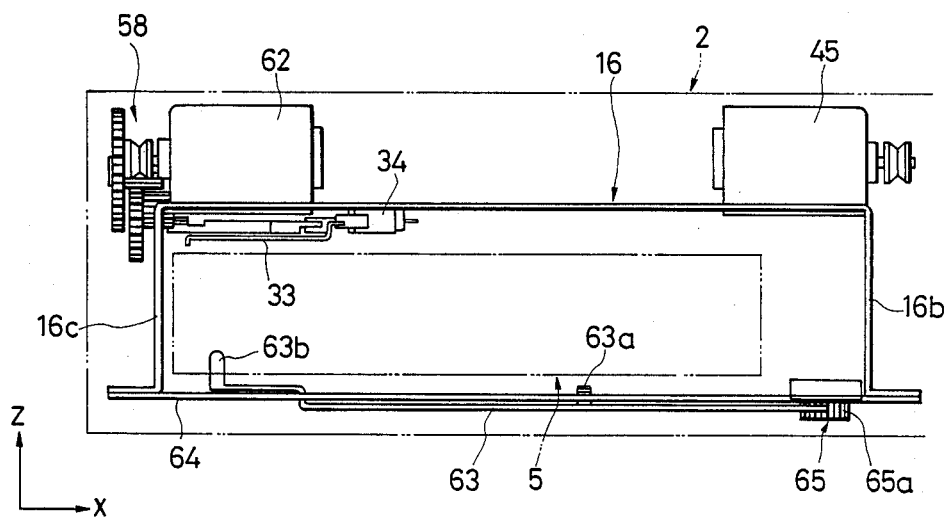
FIGS. 11 and 12 show a plan view and a front view illustrating the internal constitution of the disk player of the present invention, respectively.
Figure 11:
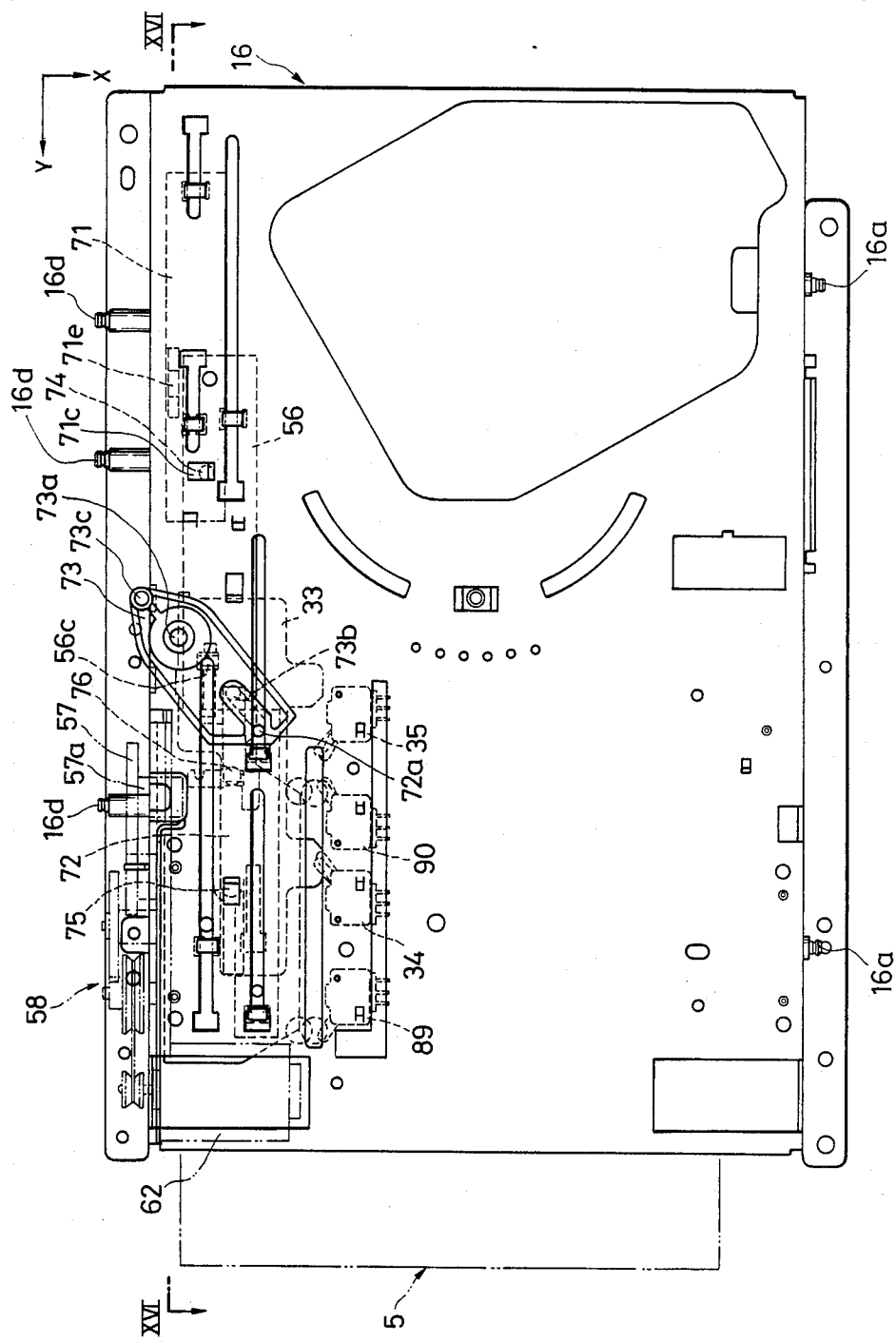

As shown in FIGS. 11 and 12, a moving lever 33 made of a steel plate is attached to the bottom of the chassis 16 at its top so that the lever can be moved forward and backward (in the directions of loading and unloading of the magazine, which are the direction of the arrow Y and the opposite thereof).

FIGS. 13(a) and 13(b) show the details of the moving lever 33. The rear end portion of the moving lever 33 is provided with a projection 33a extending downward so that the rear of the magazine 5 can be engaged with the projection 33a. When the rear of the magazine 5 is engaged with the projection 33a, the moving lever 33 is moved backward. The lever 33 is coupled with a helical spring (not shown in the drawings) for applying a forward (in the direction of the arrow Y) biasing force to the lever 33.

As shown in FIGS. 6 and 11, a pair of detection switches 34 and 35 are provided at the left side of the moving lever 33 so that the projections 33b and 33c of the moving lever 33 can be engaged with the operating elements of the switches to put the elements into action.

The moving lever 33 and the detection switches 34 and 35 constitute a magazine loading detection means for detecting that the magazine 5 is loaded in the magazine loading portion of the player housing 2.

A moving means for moving the moving member 18 upward and downward (the direction of the arrow Z and the opposite thereof is described from now on. As shown in FIGS. 6, 7 and 8, a pair of moving plates 37 and 38 are provided at the outsides of the right and left vertical surface portions 16b and 16c of the chassis 16 so that the moving plates extend forward and backward. FIGS. 14 and 15 show the details of the moving plates 37 and 38.

As shown in FIGS. 7 and 8, the moving plates 37 and 38 are provided with guide grooves 37a, 37b, 38a, 38b and 38c extending in the longitudinal directions of the moving plates. The moving plates 37 and 38 are movably fitted at the guide grooves 37a, 37b, 38a, 38b and 38c on pins 16d projecting from the outsides of the vertical surface portions 16b and 16c, so that the moving plates are attached to the chassis 16 which serves as a support member. As a result, the moving plates 37 and 38 can be reciprocated forward and backward.

As shown in FIGS. 6, 7, 8 and 9, two pins 18a and other two pins 18a project from the left and right sides of the moving member 18, respectively. As shown in FIGS. 7 and 8, the pins 18a are movably fitted in four guide grooves 16e extending upward and downward in the left and right vertical surface portions 16b and 16c of the chassis 16 which serves as a support member. As a result, the moving member 18 is guided upward and downward.

The pins 18a provided on the right and left sides of the moving member 18 project out of the chassis 16 through the guide grooves 16e thereof. The moving plates 37 and 38 are movably engaged with the pins 18a in steplike cam holes 37d and 38d provided in the inside surfaces of the moving plates. The cam hole 37d of the moving plate 37 extends generally obliquely downward (oppositely to direction of the arrow Z) and forward (in the direction of the arrow Y). The cam hole 38d of the moving plate 38 extends obliquely generally upward and forward as a whole. The cam holes 37d and 38d are so provided that the moving member 18 is moved vertically when the moving plates 37 and 38 are moved relative to each other.

As shown in FIGS. 6, 7 and 14, a rack 37h is provided at the front end of the left moving plate 37 so that the rack extends in the direction of extension of the moving plate 37. As shown in FIGS. 6 and 7, the small gear 40a of a double gear 40 provided on the chassis 16 is engaged with the rack 37h. The moving plate 37 is driven by a motor 45 through a speed reduction gear mechanism 41 including the double gear 40.

As shown in FIG. 6, a turning lever 47 is provided between the left and right moving plates 37 and 38 and attached to the chassis 16 by a pair of pins 16g projecting from the chassis, so that the lever can be turned about a virtual center 47a. The lever 47 is pivotally coupled at both ends thereof to the left and right moving plates 37 and 38.

The motor 45, the speed reduction gear mechanism 41, the turning lever 47 and ambient small members related to them constitute a driving force application means for applying driving forces to the moving plates 37 and 38.

The driving force application means and the moving plates 37 and 38 constitute a moving means for moving the moving member 18 upward and downward (in the direction of the arrow Z and the opposite thereof).

As shown in FIG. 6, a detection switch 49 is provided on the upper part of the left vertical surface portion 16b of the chassis 16 to detect that the moving plate 37, which is reciprocated forward and backward, is in the most forwardly moved position (forward movement limit position) thereof. The detection switch 49 is put into action when a part of the moving plate 37 is engaged with the operating portion of the switch.

An address plate 50 having six slits 50a disposed in the direction of movement of the moving plate 37 is provided at the right of the front end of the moving plate.

A photosensor 51 for detecting the slits 50a of the address plate 50 is provided behind the detection switch 49. The detection switch 49 is herein referred to as the first sensor, while the photosensor 51 is herein referred to as the second sensor. A slit detection signal obtained from the second sensor is sent to a counter (not shown in the drawings) which counts the number of the slit detection signals. A controller (not shown in the drawings) for automatically controlling the disk player is provided in a prescribed position inside the player housing 2. The controller determines the stopped position of the moving plate 37 in terms of the count of the counter.

The detection switch 49, which is the first sensor, the address plate 50, the photosensor 51, which is the second sensor, the counter and the controller constitute a positioning mechanism for moving the moving plate 37 to a desired address position and setting the plate in that position. When a movement command is applied as the photosensor 51 is generating the slit detection signal, the positioning mechanism acts to move the moving plate 37 through a distance corresponding to the difference between a present address and a desired address. When a movement command is applied while the photosensor 51 is not generating the slit detection signal, the positioning mechanism acts to move the moving plate 37 backward until the detection switch 49 generates a detection signal, and the positioning mechanism thereafter acts to move the moving plate 37 to a position of the desired address.

As shown in FIG. 9, a tray protruder 53, which is engaged with one of the trays 11 and 12 (refer to FIG. 2(b) etc.) in the magazine 5 to protrude the tray out of the magazine body 8, is provided at the right front corner of the moving member 18. The tray protruder 53 is shaped nearly as L-shape as a whole. A pin 53a projecting from the tray protruder 53 is slidably engaged in the arc-shaped guide groove 18d of the moving member 18 so as to guide the tray protruder 53. The tray protruder 53 is turned about the center of curvature of the arc-shaped guide groove 18d to push the tray 11 or 12 by the turned end 53b of the tray protruder 53 to protrude the tray out of the magazine body 8.

As shown in FIG. 9, the vertical axis (the center of curvature of the arc-shaped guide groove 18d) of turning of the tray protruder 53 and the position of the rotary support shaft 8a a for the trays 11 and 12 are coincident with each other. The tray protruder 53 pushes the tray 11 or 12 at the portion 11k or 12k (refer to FIGS. 4(a) and 5(a)) thereof near the rotary support shaft 8a so that the tray is protruded out of the magazine body 8.

Since the tray protruder 53 is provided on the moving member 18, the above-described moving means comprising the moving plates 37 and 38 and so forth to move the moving member 18, and the positioning mechanism comprising the address plate 50 and so forth constitute a tray protruder moving means for moving the tray protruder 53 together with the moving member 18 to put the tray protruder in such a position as to engage the tray protruder with the tray 11 or 12 bearing the disk 10 to be played.

Figure 16:
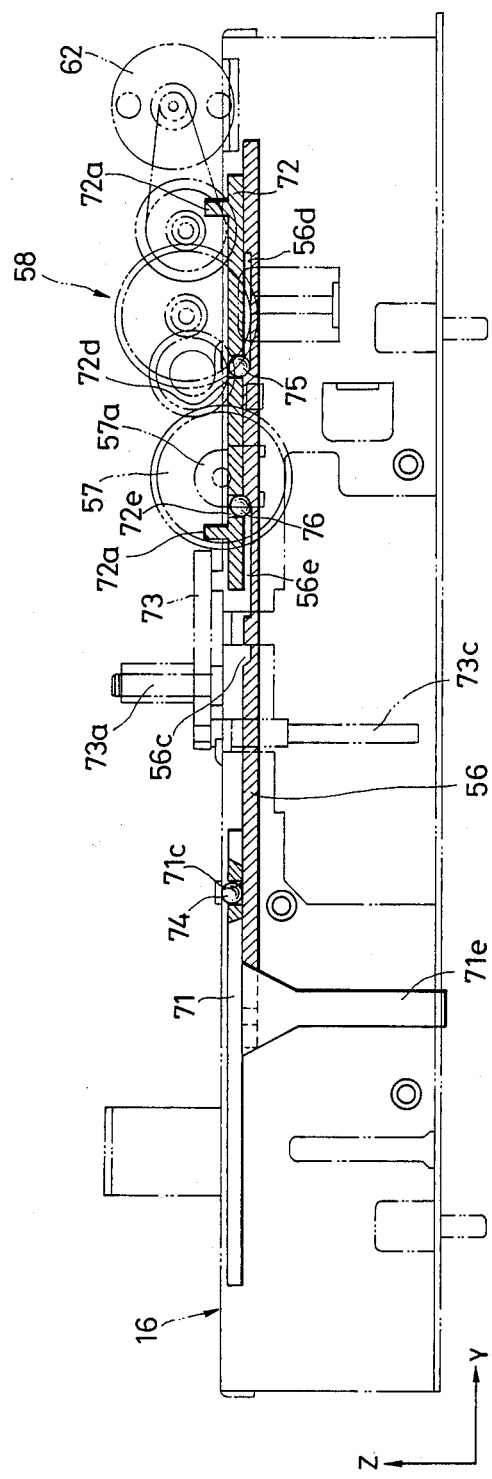
FIG. 16 shows a sectional view along a line XVI—XVI shown in FIG. 11.
Figure 17A:
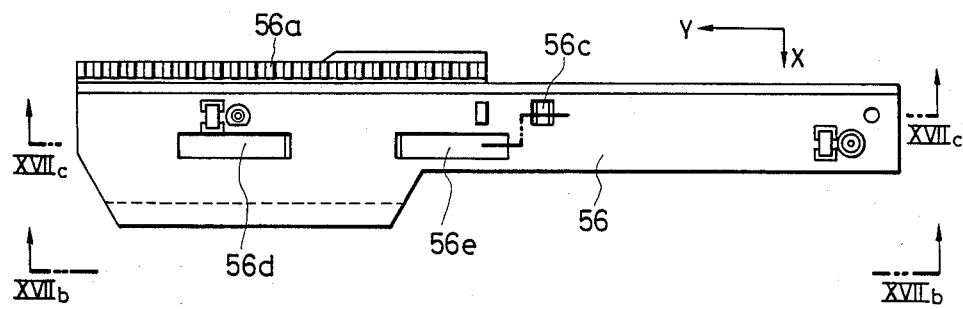
FIGS. 17(a), 17(b) and 17(c) show views for illustrating the moving member in the disk player of the present invention.
Figure 17B:
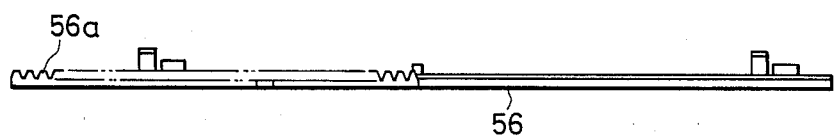
Figure 17C:
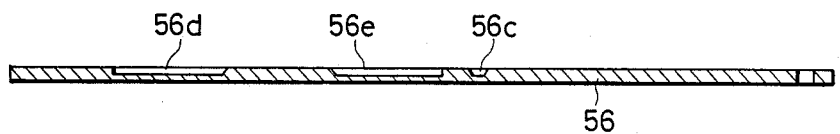

A tray protruder drive means for turning the tray protruder 53 to protrude the tray 11 or 12 out of the magazine body 8 is described from now on. As shown in FIGS. 11 and 16, a moving member 56 is provided at the right side on the under surface of the chassis 16 and extends forward and backward. The moving member 56 is attached to the chassis 16 so that the moving member 56 can be moved in the direction of its extension. FIGS. 17(a), 17(b) and 17(c) show the details of the moving member 56. A rack 56a is provided at the right front corner of the moving member 56 and extends in the direction of extension of the moving member. The small gear 57a of a double gear 57 provided on the chassis 16 is engaged with the rack 56a. The moving member 56 is driven by a motor 62 through a speed reduction gear mechanism 58 including the double gear 57. The speed reduction gear mechanism 58 and the motor 62 constitute a driving force application means for applying a driving force to the moving member 56.

Figure 18:
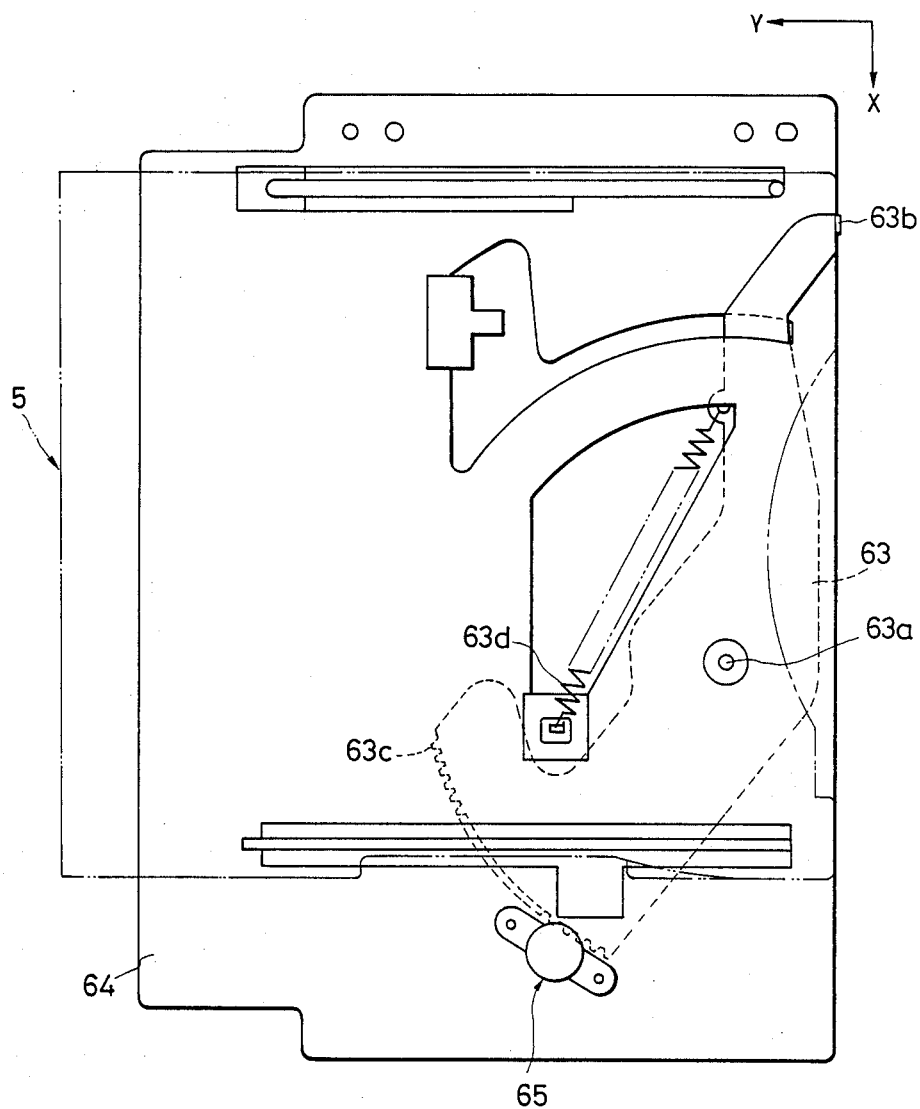
FIG. 18 shows a partial plan view of the internal constitution of the disk player of the present invention.
Figure 19A:
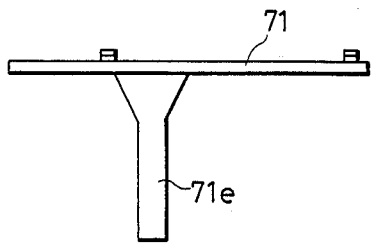
FIGS. 19(a), 19(b), 20(a) and 20(b) show views for illustrating the first and second levers in the disk player of the present invention.
Figure 19B:
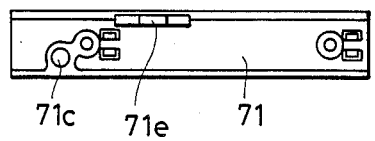
Figure 20A:
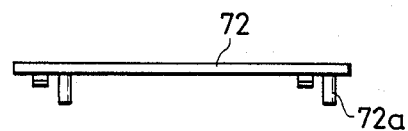
Figure 20B:
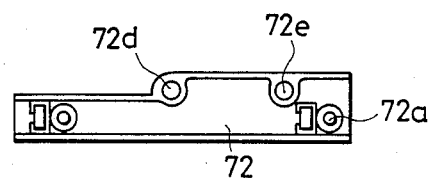

As shown in FIGS. 12 and 18, a swing lever 63 is provided near the bottom of the magazine loading portion of the player housing 2 and extends nearly rightward and leftward so that the magazine 5 loaded in the magazine loading portion is protruded out of the portion by the swing lever. The swing lever 63 is attached nearly at its central portion by a pin 63a to an auxiliary chassis 64 provided at the bottom of the chassis 16, so that the lever 63 is swingable. The pin 63a extends upward and downward (in the direction of the arrow Z and the opposite thereof). A projection 63b is provided at the right end of the swing lever 63 and extends upward. The projection 63b of the swing lever 63 is brought into contact with the rear of the magazine 5. A gear 63c, the center of curvature of which is on the pin 63a, is provided at the left end of the swing lever 63 and engaged with the brake gear 65a (shown in FIG. 12) of a damper 65, which applies a braking force by the viscous resistance of a viscous substance such as grease held in the damper. A helical spring 63d applies a magazine protruding force to the swing lever 63.

The swing lever 63, the damper 65 and the helical spring 63d constitute a protrusion means for protruding the magazine 5 out of the magazine loading portion of the player housing 2.

A locking member (not shown in the drawings) is rotatably provided near the moving member 56 so that the turning end of the locking member is engaged in the engaging recess 5g (refer to FIGS. 2(b) and 2(c)) of the magazine 5 to lock the magazine 5 in its loaded position in the player housing 2. When the moving member 56 is moved forward, the magazine 5 is unlocked from the locking member.

As shown in FIGS. 11 and 16, a first lever 71 and a second lever 72 are provided at the right end of the chassis 16 and extend forward and backward (in the direction of the arrow Y and the opposite thereof). The levers 71 and 72 are attached to the chassis 16 so that the levers can be reciprocated in the directions of their extension. FIGS. 19(a), 19(b), 20(a) and 20(b) show the details of the first and the second levers 71 and 72. The first lever 71 is for driving the supports of a clamp mechanism described hereinafter. The second lever 72 is for turning the tray protruder 53 (refer to FIG. 9) through an intermediate lever 73 shown in FIGS. 11 and 16.

The intermediate lever 73 is rotatably supported on the chassis 16 by a pin 73a extending upward and downward. A pin 72a projecting from the second lever 72 is engaged in a cam groove 73b (shown in FIG. 11) provided at the turning end of the intermediate lever 73, so that the lever 73 is turned. A rod 73c extending downward is provided at the other turning end of the intermediate lever 73 and fitted in the hole 53d of the tray protruder 53 (shown in FIG. 9) to turn the tray protruder.

The first and the second levers 71 and 72 are moved by the moving member 56.

As shown in FIGS. 11, 16, 17(a) and 17(c), a first recess 56c is provided in a prescribed position in the moving member 56.

As shown in FIGS. 11 and 16, the first lever 71 is provided with a first opening 71c which can face the first recess 56c. A movable member 74, which can be engaged in the first recess 56c, is provided in the first opening 71c.

The first recess 56c, the first opening 71c, the movable member 74 and so forth constitute a locking/unlocking means for appropriately locking or unlocking the first lever 71 to or from the moving member 56 depending on the movement thereof. In other words, the first lever 71 is moved or stopped together with the moving member 56 depending on the distance of the movement thereof, to drive the clamp mechanism described hereinafter. The locking/unlocking means is described in detail in the Japanese Patent Application No. 29309/84 and in the U.S. Pat. No. 4,631,716, incorporated herein by reference.

As shown in FIGS. 11, 16, 17(a) and 17(c), the moving member 56 is provided with a second and a third recesses 56d and 56e. On the other hand, the second lever 72 is provided with a second and a third openings 72d and 72e which can face the second and the third recesses 56d and 56e. The movable member 75 is provided between the second recess 56d and the second opening 72d. The movable member 76 is provided between the third recess 56e and the third opening 72e.

The second and the third recesses 56d and 56e, the second and the third openings 72d and 72e, the movable members 75 and 76 and so forth constitute a locking/unlocking means for appropriately locking or unlocking the second lever 72 to or from the moving member 56 depending on the movement thereof. In other words, the second lever 72 is moved or stopped together with the moving member 56 depending on the distance of the movement thereof, to drive the tray protruder 56 (refer to FIG. 9). The locking/unlocking means is described in detail in the Japanese Patent Application No. 72908/85.

The locking/unlocking means, the second lever 72, the moving member 56 and the driving force application means including the motor 62 and so forth to apply the driving force to the moving member 56 constitute a tray protruder drive means for turning the tray protruder 53 (shown in FIG. 9) to protrude the tray 11 or 12 (refer to FIGS. 4 and 5) out of the magazine body 8.

The tray protruder drive means, the chassis being a support member, the moving member 18, the tray protruder 53 and the tray protruder moving means including the moving plates 37 and 38 and so forth constitute a tray protrusion means for protruding the tray 11 or 12 out of the magazine body 8 as the tray remains bearing the disk 10 to be played.

Figure 24:
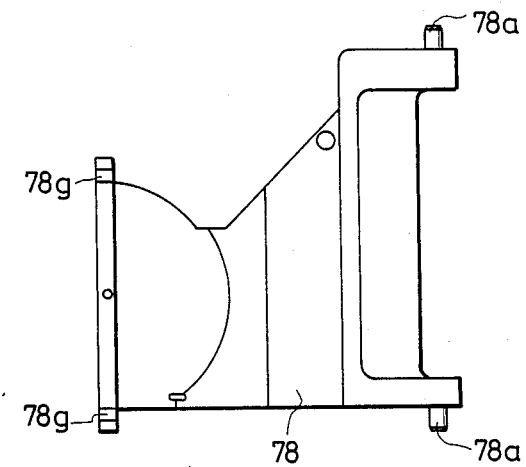
Figure 25:
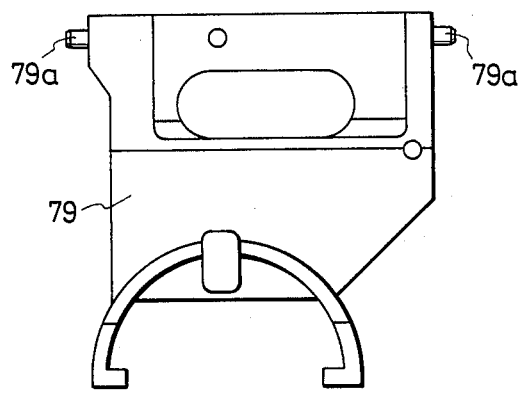

As shown in FIGS. 9, 21, 22 and 23, a pair of plate-shaped supports 78 and 79 are provided on the moving member 18 and extend forward and backward (in the direction of the arrow Y and the opposite thereof) and rightward and leftward (in the direction of the arrow X and the opposite thereof). The supports 78 and 79 are attached to the moving member 18 by pins 78a and 79a so that the supports are swung in planes nearly perpendicular to the disk bearing side 23a (shown in FIG. 10) of the turntable 23 (refer to FIGS. 8 and 10). FIGS. 24 and 25 show the details of the supports 78 and 79. A disk-shaped pusher 80 (FIGS. 21-23) is rotatably attachable to the free ends of the supports 78 and 79 so that the pusher 80 is brought into contact with the side of the disk 10 opposite to the turntable 23 to clamp the disk in cooperation with the turntable. To be more concrete, the free end of the support 78 is located in contact with the side of a flange 81a opposite to the disk pushing side thereof. The flange 81a is provided on the body 81 of the pusher 80. The free end of the other support 79 is located in contact with the disk pushing side of the flange 81a. The pusher 80 is vertically pinched between the free ends of the supports 78 and 79.

Figures 21, 22, 23:
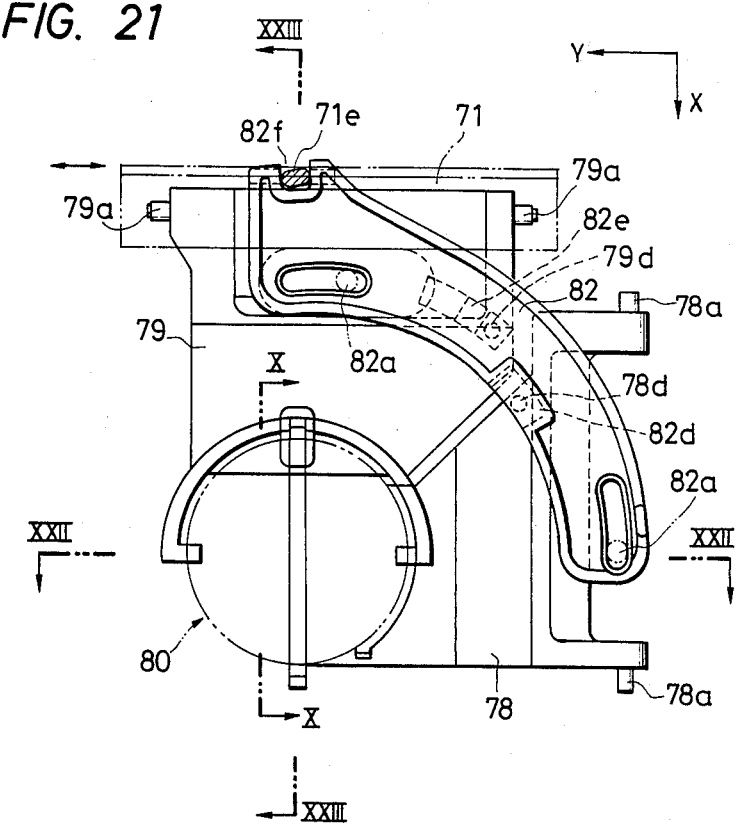
FIGS. 21, 22, 23, 24 and 25 show views for illustrating the support plates of the pushing means in the disk player of the present invention.

As shown in FIGS. 9 and 21, a clamp cam 82 shaped as a bow is provided over the supports 78 and 79 and attached to the moving member 18 (refer to FIG. 9) by pins 82a a so that the clamp cam 82 is moved about its center of curvature. FIGS. 26(a), 26(b), 26(c) and 27 show the details of the clamp cam 82.

As shown in FIG. 26(c) and 27, the nearly central part of the clamp cam 82 is provided with cam portions 82d and 82e, which are engaged with columnar projections 78d and 79d (shown in FIG. 21) provided on the tops of the supports 78 and 79. The clamp cam 82 is reciprocated to drive the supports 78 and 79 to tighten and loosen the pusher 80 to and from the turntable 23. The cam portions 82d and 82e are so shaped that the supports 78 and 79 are separated from the pusher 80 after the pusher is certainly attracted and tightened to the turntable 23 by a magnet force of the magnet 23b when the disc is to be clamped and that the pusher is separated from the turntable after the pinching of the pusher between the supports is completed when the disc is to be released from its clamped state.

As shown in FIGS. 21, 26(a) and 26(c), a U-shaped notch 82f is provided at one end of the clamp cam 82 and smoothly engaged with a projection 71e provided on the first lever 71 (shown in FIGS. 11, 16, 19(a) and 19(b)) and extending downward. The first lever 71 is reciprocated to move the clamp cam 82 to swing the supports 78 and 79 upward and downward.

The clamp cam 82, the first lever 71, the moving member 56 (shown in FIG. 17, etc.), the locking/unlocking means including the movable member 74 and so forth to appropriately lock or unlock the first lever 71 and the moving member 56 to or from each other depending on the movement of the moving member, and the driving force application means including the motor 62 and so forth to apply the driving force to the moving member 56 constitute a drive means for driving the supports 78 and 79.

The drive means and the supports 78 and 79 constitute a pusher moving means for tightening and loosening the pusher 80 to and from the turntable 23.

The pusher moving means and the pusher 80 constitute the clamp mechanism for clamping the disk 10.

in FIGS. 22 and 23, springs 78f and 79f are provided to urge the supports 78 and 79 in such directions as to move the pusher 80 toward the disk bearing side 23a (refer to FIG. 10) of the turntable 23.

As shown in FIG. 10 indicating a view taken on line X—X shown in FIG. 21, a slope or tapered portion 78g is provided at the free end of the support 78 so that the slope is engaged with the peripheral portion (of the body 81) of the pusher 80 to position the pusher in a plane parallel with the disk bearing side 23a of the turntable 23. The pusher 80 can thus be accurately aligned to the turntable 23.

The forms of the turntable 23 and of the pusher 80 are described in detail from now on. As shown in FIG. 23, the pusher 80 is provided with a disk centering projection 84, which is fitted in the center hole of the disk 10 to center the disk. The turntable 23 is provided with a recess 23c (FIG. 10), in which the disk centering projection 84 is fitted when the disk 10 is clamped on the turntable. Because of such construction, the disk 10 is prevented from deviating in the direction parallel with the disk bearing side 23a of the turntable 23.

Figure 28:
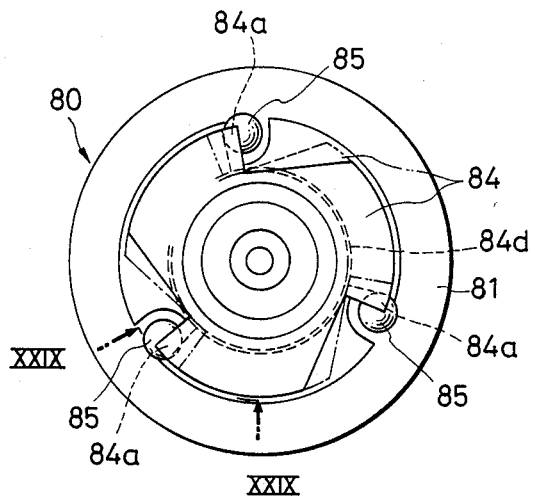
FIGS. 28 and 29 show views for illustrating the pusher of the present invention.
Figure 29:
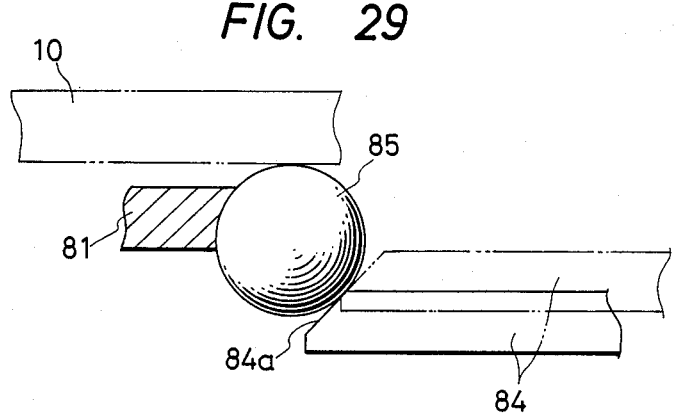

FIG. 28 shows a view taken along line XXVIII—XXVIII shown in FIG. 10. FIG. 29 shows a sectional view along a line XXIX—XXIX shown in FIG. 28. As shown in FIGS. 28 and 29, the disk centering projection 84 of the pusher 80 is movable in a prescribed range along the axis of gyration of the pusher. The disk centering projection 84 is attached to the body 81 of the pusher 80 through a cam means which comprises three cam surfaces 84a provided on the disk centering projection 84 and three spherical guide members 85 provided on the body 81 of the pusher 80 so as to slide in contact with the cam surfaces 84a. When the disk centering projection 84 is moved along the axis of gyration of the pusher 80, the projection is rotated about the axis.

As shown in FIG. 28, a spring 84d is provided as an urging means for urging the disk centering projection 84 to rotate it to project upward (in the direction of the arrow Z) from the body 81 of the pusher 80.

The three spherical guides 85 are emplaced at equal intervals in the direction of gyration of the pusher 80. As shown in FIGS. 10 and 29, a part of each of the spherical guides 85 project at the disk pushing side of the body 81 of the pusher 80 so that the part is located in contact with the surface of the disk 10. For that reason, the disk 10 is supported at three points by the pusher 80 so that the disk is accurately clamped.

The above-described clamp mechanism acts as a disk moving means so that the disk 10 borne on the tray 11 or 12 protruded out of the magazine body 8 by the tray protrusion means is moved in an upward direction (the direction of the arrow Z) perpendicular to the disk bearing side 23a (refer to FIG. 10) of the turntable 23.

The disk moving means and the tray protrusion means constitute a disk takeout and conveyance mechanism for sequentially selecting each of the desired disks 10 in the magazine 5 and conveying the selected disk onto the disk bearing side 23a of the turntable 23.

Figure 30A:
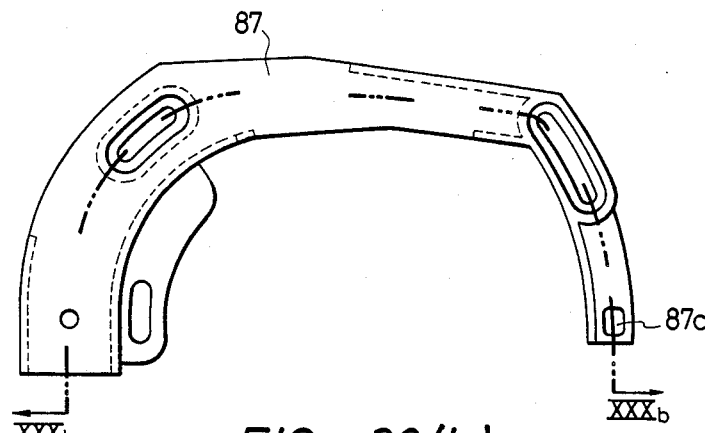
FIGS. 30(a), 30(b), 30(c), 30(d) and 30(e) show views for illustrating the disk pusher in the disk player of the present invention.
Figure 30B:
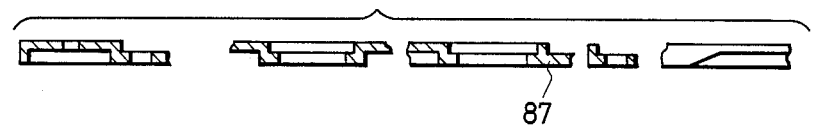
Figure 30C:
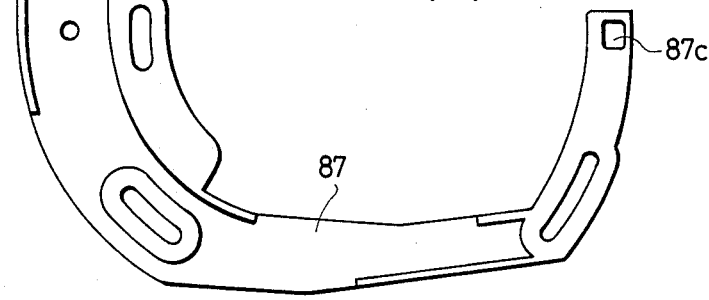

As shown in FIG. 9, a disk pusher drive cam 87 shaped nearly as a bow is provided on the moving member 18 and attached to the moving member 18 by a pin 87a so that the cam 87 is moved about its center of curvature. FIGS. 30(a), 30(b) and 30(c) show the details of the disk pusher drive cam 87.

Figure 30D:
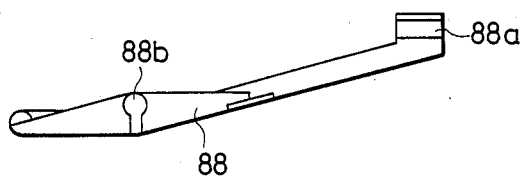
Figure 30E:
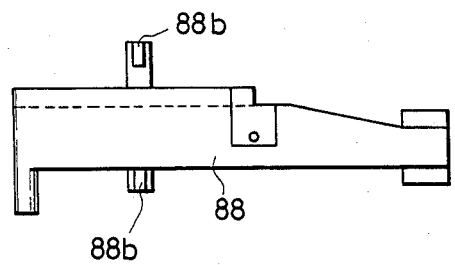
Figure 31:
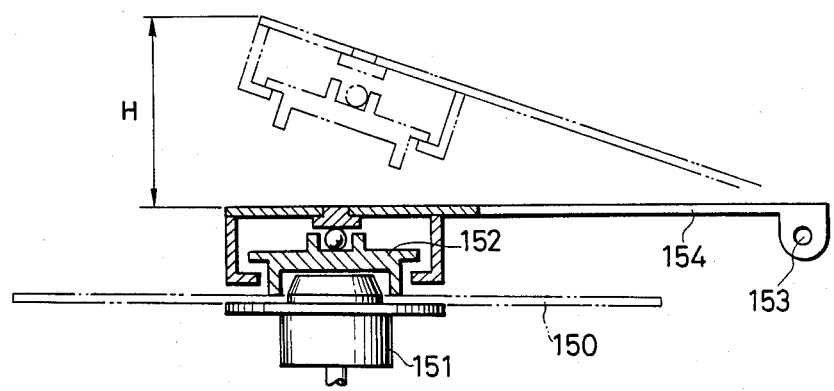
FIG. 31 shows a view for illustrating a clamping mechanism of a conventional disk player.

As shown in FIGS. 9, 30(a) and 30(c), an opening 87c is provided at one end of the disk pusher drive cam 87. A pin 82h (refer to FIGS. 26(a) and 26(b)) projecting upward from the end of the clamp cam 82 is smoothly fitted in the opening 87c so that the disk pusher drive cam 87 is moved as the clamp cam 82 is moved. The disk pusher drive cam 87 is for driving a disk pusher 88 (shown in FIGS. 9, 30(d) and 30(e)), whose free end 88a is brought into contact with the side (facing the disk bearing side 23a of the turntable 23) of the disk moved by the disk moving means (the clamp mechanism) in a vertical direction perpendicular to the disk bearing side 23a (refer to FIG. 10). As a result, the disk pusher 88 maintains the moved disk 10 to be parallel to the disk bearing side 23a of the turntable 23. The disk pusher 88 is vertically swung about a support pin 88b when the disk pusher drive cam 87 is moved along the curvature thereof.

As shown in FIGS. 6 and 11, the chassis 16 is provided with two detection switches 89 and 90 along the detection switches 34 and 35. The detection switches 89 and 90 are for detecting the moved position of the moving member 56 as the switches are engaged with the moving member driven by the motor 62.

Detection signals sent from the detection switches 34, 35, 49, 89 and 90 and the photosensor 51 are entered into the above-mentioned controller (not shown in the drawings), which sends out operation signals to operate the motors 45 and 62 and the turntable 23 at prescribed timing described hereinafter.

The operation of the multidisk player with the above-described constitution is now briefly described in the sequence of playing steps. When the disk to be played is first appointed by manipulating the operation buttons 6 shown in FIG. 1, a driving voltage is applied to the motor 45 (refer to FIG. 6) to start moving the moving plates 37 and 38 forward (in the direction of the arrow Y) or backward (in the opposite of the direction of the arrow Y). As a results, the pins 18a movably fitted in the steplike cam grooves 37d and 38d of the moving plates 37 and 38 and the guide grooves 16e of the chassis 16 are moved up or down so that the moving member 18 having the pins 18a is moved up or down. For that reason, the tray protruder 53 (shown in FIG. 9) provided on the moving member 18 reaches a position in which the tray protruder is engageable with the tray 11 or 12 bearing the disk to be played.

When the tray protruder 53 is thus put in the position in which the tray protruder 53 can be engaged with the tray bearing the disk to be played, the rotation of the motor 62 (refer to FIG. 11) is started to drive the moving member 56 backward (in the direction opposite to that of the arrow Y). At that time, the moving member 56 remains locked to the second lever 72 by the locking/unlocking means including the movable members 75 and 76 (refer to FIGS. 16 etc.), and the first lever 71 is not yet locked to the moving member 56. For that reason, only the second lever 72 is moved backward together with the moving member 56 to turn the tray protruder 53 counterclockwise as to FIG. 9. Consequently, the tray (for example, the tray 12) bearing the disk to be played is protruded out of the magazine body 8, as shown in FIG. 2(b), so that the disk is moved to a position in which the disk is coaxial with the disk bearing side 23a (refer to FIG. 10) of the turntable 23 or located immediately under the disk bearing side.

Then, the moving member 56 is moved backward further oppositely to the direction of the arrow Y, and the second lever 72 is unlocked from the moving member and the first lever 71 is simultaneously locked to the moving member. Therefore, the first lever 71 is moved backward together with the moving member 56 so that the supports 78 and 79 (shown in FIGS. 21 etc.) of the clamp mechanism is swung upward (in the direction of the arrow Z). For that reason, the disk is lifted upward so that it is clamped on the turntable 23. As a result, the disk can be played by operating the turntable 23 and the carriage 24 (refer to FIG. 9).

After the disk is played, it is housed back in the magazine body 8. Since the operation of housing the disk back in the magazine body 8 is performed by inversely performing the steps of the above-described operation of loading the disk on the turntable 23, the operation of housing the disk back in the magazine body is not described in detail. Such operations are repeated depending on the number of appointed disks or tunes.

As described above, in a disk player provided in accordance with the present invention, a clamp mechanism for clamping a disk 10 comprises a pusher 80, which acts to clamp the disk in cooperation with a turntable 23, and a pusher moving means for tightening and loosening the pusher to and from the turntable. The pusher moving means comprises a pair of supports 78 and 79, which are swingable in planes nearly perpendicular to the disk bearing side 23a of the turntable 23 and whose free ends are brought into contact with the disk pushing side of the pusher and the opposite side thereof to pinch the pusher therebetween, and drive means for driving the supports. Because of such constitution, the pusher 80 keeps parallel with the disk bearing side of the turntable whatever position the pusher takes. For that reason, the stroke of the swing of the supports 78 and 79, which are necessary to prevent the pusher and the disk on the turntable from coming into contact with each other when the disk is released from the clamp mechanism, can be decreased to make it easy to reduce the size of the whole disk player, particularly the height thereof.

Furthermore, since a mechanism for keeping the pusher parallel with the disk bearing side of the turntable is substantially made of only the pair of supports, the cost of the disk player can be also reduced.

Furthermore, according to the present invention, when the disc is to be clamped, the pushing means 80 is attracted and tightened to the turntable 23 by a magnet force of the magnet in the turntable 23 before the pair of support members 78 and 79 are separated from the pushing means 80. When the disk is to be released from its clamped state, the pair of support members 78 and 79 pinch the pushing means 80 therebetween before the pushing means is separated from the turntable 23.

Therefore, even if the disk player as a whole is set upside down, clamping of the disk is accomplished certainly. Furthermore, when the disk is to be released from the clamping mechanism, the pushing means is separated from the turntable, with the pair of supports pinching the pushing means therebetween. Therefore, noise is not produced when the pushing means is separated from the turntable.

In the disc player of the present invention, a magnet 23b for producing a disc clamping force is provided in a turntable 23. The holding means (bearing plate 22) for holding a spindle motor bearing and rotating the turntable 23 is made of magnetic material. The holding means 22 is placed so as to face the side of the turntable 23 which is a reverse side of its disk mounting side.

By the above-described construction, the output shaft of the spindle motor and the bearing portion in the spindle motor for supporting the output shaft are put into tight contact with each other. As a result, the turntable can be rotated without shaking or rolling. As described above, in the present invention, in order to make the output shaft of the spindle motor contact tightly with the bearing member in the spindle motor, there is not provided additional particular member. Therefore, the cost of producing the disk player is reduced.

Furthermore, according to the present invention, a multidisk player comprises a player housing 2, playing means for playing the disk, the playing means having a turntable 23 for mounting a disk thereon and being placed inside of the player housing, disk holding means (magazine 5) for holding a plurality of disks 10, the disk holding means capable of being inserted into the player housing to be loaded at a loading portion inside of the player housing, the disk holding means comprising a housing portion (magazine body 8) and a plurality of tray members 11 and 12 for bearing disks, the tray members being provided inside of the housing portion in such a manner that the tray members are disposed in a direction nearly perpendicular to the disc bearing side 23a of the turntable, the tray members being capable of protruding out of the housing portion and disk takeout and conveyance mechanism for taking a disk out of the disk holding means and conveying the disk to a playing position, the disk take out and conveyance mechanism having supporting member (chassis 16) extending in a direction of the disposition of the tray members, moving member 18 provided on the supporting member movably in the direction of the disposition of the tray members, protruding means 53 for protruding the tray member out of the housing portion of the tray holding means by engaging its one rotational end with the tray member in the tray holding means, the protruding means being rotatably provided on the moving member, moving means for moving the protruding means together with the moving member to a position where the one rotational end of the protruding means is engageable with the tray member, pushing means 80 for clamping the disk in cooperation with the turntable, supporting means 78 and 79 for rotatably supporting the pushing means, the supporting means being movable in planes nearly perpendicular to the disk bearing side of the turntable, first lever means 71 for moving the supporting means 78 and 79, the first lever means being provided on the supporting member (chassis 16) movably in the disk holding means (magazine 5) loading direction, second lever means 72 for rotating the tray protruding means 53, the second lever means being provided on the supporting member 16 movably in the first lever moving direction, moving means 56 for moving the first and second lever means, the first and second lever means moving means being provided on the supporting member movably in the first and second lever means moving direction, driving force application means (motor 62, etc.) for applying driving force to the first and second lever moving means, and locking/unlocking means (movable members 74, 75 and 76, etc.) for selectively locking/unlocking the first and second lever means with respect to the moving means 56 depending on the movement of the moving means.

The playing means including the turntable 23 and the pickup means, etc. are moved together with the moving member 18 in the direction of the arrangement of the trays 11 and 12. Therefore, the turntable is moved relative to the trays 11 and 12 in the tray disposition direction. Then, the tray protruding means 53 is moved to rotate and push the selected one of the trays, as a result of which the tray is protruded out of the housing (magazine body 8) of the disk holding means (magazine 5). As a result, the disk 10 on the tray is moved to be placed immediately under the turntable 23. Then, the supporting means 78 and 79 are moved to lift up the disk 10 with the pushing means 80 and set the disc 10 on the turntable 23.

In this construction, since the moving means 56, the first and second lever means 71 and 72 and the lock/unlocking means are provided, it makes possible the reduction in the size of the disk player, as will be described below. If there are not provided the first and second lever means but only the moving means 56 is provided, the moving means 56 directly moves the supporting means 78 and 79 and also the tray protruding means 53. In this case, the linear space required for moving the moving means 56 for moving the supporting means 78 and 79 and the tray protruding means 53 is very large and is almost the same as the total length of the disk player. Furthermore, since it is necessary to place other members in such a manner that the members do not obstruct the path of the moving means 56, it becomes necessary to increase the size of the disc player in its direction perpendicular to the movement of the moving means 56.

However, according to the present invention, as described above, there are provided not only the moving means 56 but also the first and second lever means 71 and 72. As a result, the stroke of the movement of the moving means required is reduced. Furthermore, since the linear space required for moving the moving means is not on the same line with the linear spaces required for moving the first and second lever means, the total volume of the linear spaces required for moving them is reduced, to thereby make the disk player compact.

Various modifications and variations could be made in the invention without departing from the scope or spirit of the invention.

We claim:

1. A disk player comprising:
a turntable having a disk bearing side; and
a clamp mechanism for clamping a disk put on said disk bearing side of said turntable, said clamp mechanism having pushing means with a disk pushing side for clamping the disk in cooperation with said turntable and moving means for moving said pushing means toward and away from said turntable, said moving means comprising a pair of support members, said pair of support members being swingable in planes nearly perpendicular to the disk bearing side of said turntable and having free ends capable of contacting with said disk pushing side of said pushing means and an opposite side of said pushing means, respectively, to pinch said pushing means therebetween, and drive means for driving said pair of supporting members.

2. A disk player according to claim 1, wherein at least one of said free ends of said pair of support members is provided with a tapered portion to be engaged with a portion of said pushing means peripheral to said disk pushing side, to thereby position said pushing means in a plane parallel with the disk bearing side of said turntable.

3. A disk player claimed in claim 1, wherein said pushing means includes means for tightening said pushing means to said turntable before said pair of support members are separated from said pushing means, to thereby complete the clamping of the disk, and said pair of support members pinch said pushing means therebetween before said pushing means is separated from said turntable to thereby release the clamping of the disk.

4. A disk player claimed in claim 3, wherein said pushing means comprises a disk centering projection means for being fitted in a center hole of the disk, and said turntable comprises means for receiving said disk centering projection means.

5. A disk player for a disk, comprising:
a turntable for bearing a disk, said turntable having a magnet;
a spindle motor having a rotatable shaft bearing said turntable for rotating said turntable;
a holder;
a clamping mechanism for clamping a disk mounted on said turntable, said clamping mechanism having magnetic means and pushing means for clamping the disk in cooperation with said turntable by a magnetic force of said magnet and said magnetic means and moving means attached to said holder for moving said pushing means toward and away from said turntable; and
a plate for holding said spindle motor to said holder, said plate being made of magnetic material and being placed to face the reverse side of a disk bearing side of the said turntable.

6. A disk player claimed in claim 1 further comprising:
a spindle motor having a rotatable shaft bearing said turntable for rotating said turntable; said turntable having a magnet;
a holder, said moving means being attached to said holder; and
a plate for holding said spindle motor to said holder, said plate being made of a magnetic material and being placed to face the reverse side of said disk bearing side of said turntable;
wherein said clamping mechanism further includes magnetic means for clamping said disk in cooperation with said pushing means and with said turntable by a magnetic force of said magnet and of said magnetic means.

* * * * *